Nov. 3, 1931.　　　　　C. R. FISHER　　　　　1,829,955

ELECTRIC APPARATUS FOR SHOVELS AND THE LIKE

Filed Feb. 27, 1928

Inventor

Charles R. Fisher

By Whittemore Hulbert Whittemore Belknap
Attorneys

Patented Nov. 3, 1931

1,829,955

UNITED STATES PATENT OFFICE

CHARLES R. FISHER, OF ROGERS CITY, MICHIGAN

ELECTRIC APPARATUS FOR SHOVELS AND THE LIKE

Application filed February 27, 1928. Serial No. 257,478.

The invention relates to improvement in electrical systems for converting electric power into mechanical work and is particularly applicable to the so-called Ward-Leonard system. This system has been used extensively in certain types of electrical apparatus, such for example as electric shovels and my improvement is particularly applicable thereto.

One of the objects of the invention is to provide means for automatically increasing the field flux and holding in torque of the main synchronous motor when the load on the driven generator is increased.

Another object is to provide a system wherein the field excitation of the main synchronous motor is maintained relatively low when the load on the main driven generator is small in order to prevent undue heating in the coils and deterioration thereof.

Another object of the invention is to provide means for improving the power factor of the apparatus under all conditions of load.

Figure 1:
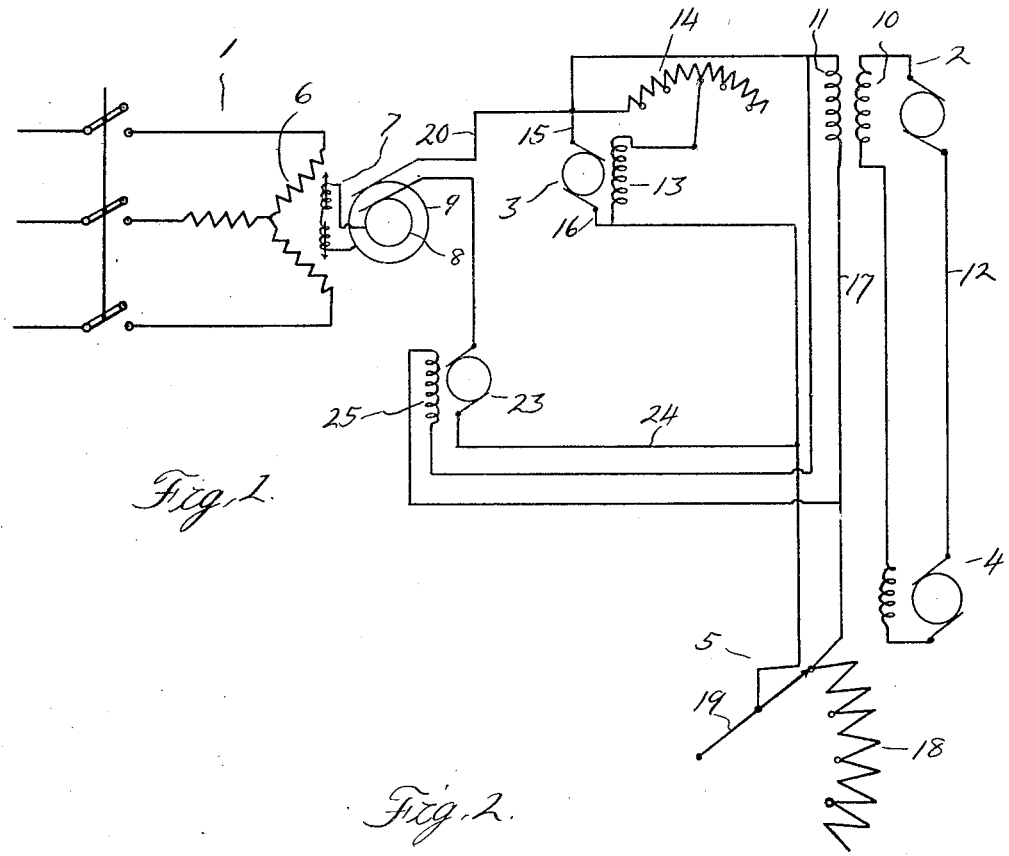
Figure 2:
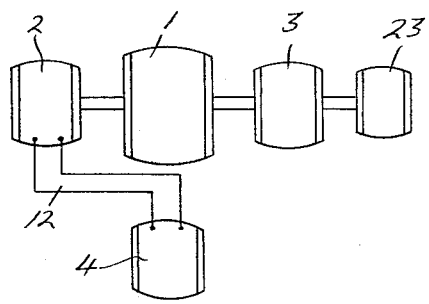

These and other objects are attained in the manner hereinafter set forth and illustrated in the accompanying drawings, wherein Figure 1 is an electrical diagram of a Ward-Leonard system modified in accordance with my invention;

Figure 2 is a diagrammatic view illustrating the mechanical connections between the various units of the apparatus.

Referring now to the apparatus as illustrated in Figure 2, 1 represents the main synchronous motor deriving its energy from a power line which preferably is a three phase A. C. system. 2 represents a direct current generator driven by the synchronous motor and preferably arranged in axial alignment therewith. 3 represents an exciter which is a direct current generator of suitable size to provide the field excitation current for the electrical units driven by the synchronous motor. 4 represents a motor electrically connected to the generator and adapted for intermittent operation under various conditions of load. For controlling the motor 4 a suitably manually operable controller 5 is provided, which is adapted to control the field excitation of the generator 2 and thus indirectly control the speed of the motor.

If the electrical system is applied to an electric shovel, the motor 4 is used for controlling the hoist on the shovel and the generator 2 is used for supplying the current for operating the motor 4. In the operation of an electric shovel the load on the hoist motor varies between wide limits and it is to maintain an efficiently operating system under such conditions that the present invention has been made.

Referring now to the details of the electrical system as illustrated in Figure 1, the synchronous motor 1 is a standard type including the stator 6 and the rotating motor field 7. 8 and 9 are slip rings by means of which the excitation current is delivered to the rotating field.

The main generator 2 is a standard direct current generator provided with a bucking differential series field 10 and a separately excited shunt field 11. The motor 4 is preferably a series wound direct current motor connected by means of the circuit 12 with the generator 2. The exciter 3 is a shunt wound direct current generator having shunt field 13 and manually adjustable rheostat 14. The terminals 15 and 16 of the exciter are connected to a circuit 17 including the shunt field 11 of the generator 2 and the controller rheostat 18. 19 represents diagrammatically the manually adjustable controller arm for varying the amount of resistance included in the circuit 17. This controller may be constructed in accordance with standard practice and is illustrated only diagrammatically in order to show the method of varying the field excitation of the generator 2. The synchronous motor field 7 is also excited by the exciter 3 and as shown in the diagram 20 is an electrical conductor between the slip ring 9 and terminal 15.

With the system as thus far described, the control of the motor 4 is by means of the controller 19 which varies the current through the shunt field 11 between the limits of its capacity. The series motor 4 being under various conditions of load will therefore cause a considerable variation in load on the generator 2 which in turn by means of its mechanical connection with the synchronous motor 1 will cause considerable variation in the current supplied to the stator 6. If the load on the generator becomes too great there is danger of decreasing the holding in torque of the synchronous motor which would immediately shut down the apparatus. On the other hand, if the field excitation of the synchronous motor is large enough to maintain the holding in torque of the motor under abnormal demands, it provides too great a current through the field under conditions of light load consequently causing undue heating of the coils and sometimes burning out of the same.

My invention overcomes the disadvantages enumerated above, by eliminating the usual connection 21 between the slip ring 8 and terminal 16 and providing means for supplementing the excitation current from exciter 3 and varying the same in accordance with the load upon the generator 2. Thus as shown, I have provided a booster generator 23 arranged in circuit 24 between the slip ring 8 and terminal 16. This booster generator is preferably a shunt wound direct current generator and is preferably driven from the main synchronous motor. The shunt field 25 is connected in parallel with the shunt field 11 of the main generator 2, the arrangement being such that the excitation of the generator 23 is variable corresponding to the variations in current in the field 11.

Thus the movement of the controller arm 19 not only varies the excitation of the main generator 2 but also that of the booster generator 23 and consequently the excitation current delivered to the synchronous motor field 7 is increased upon increased load, thereby increasing the field flux and maintaining the holding in torque of the synchronous motor.

In the operation of the system as above described the synchronous motor 1, the generator 2 and the exciters 3 and 4 are all constantly maintained in operation. The motor 4 for directly operating the apparatus such as the hoist of a shovel is intermittently operated by means of the controller 19, the arrangement being such that when the resistance 18 is a maximum quantity the excitation of both the main generator 2 and the booster generator 23 is very slight thereby causing very little generation of current in the circuit 12 leading to the series motor and correspondingly very little generation of current by the booster generator leading to the field of the synchronous motor. Therefore when the motor 4 is inoperative the synchronous motor field 7 is supplied by the exciter 3 without substantial aid of the booster generator and the amount of current delivered to the field under such conditions can be regulated by means of the rheostat 14 to only that amount necessary to maintain the holding in torque under conditions of light load. As the controller 19 is operated to cut out the resistance 18 the main generator 2 receives an increased excitation current and the booster generator also receives a greater excitation current, the result being that the amount of current used for exciting the synchronous motor field is increased corresponding to the increase in load on the generator. One of the important features of my invention is that the means for automatically varying the current to the synchronous motor field in accordance with the load also improves the power factor under conditions of heavy load and causes the same to be held to a value closer to unity under all conditions of load than would otherwise be the case.

While I have described and illustrated an embodiment of my invention particularly applicable for operating a direct current series motor connected to the hoist of an electric shovel, it is to be understood that my invention has many other applications and in general can be used wherever an electrical system of the Ward-Leonard type is employed.

What I claim as my invention is:

1. In an electrical system the combination of a synchronous motor, a D. C. generator, an exciter generator, a booster generator, said generators all being driven by said synchronous motor, a D. C. motor electrically connected to said D. C. generator, said synchronous motor having the field thereof electrically connected to said exciter and said booster generator, a rheostat electrically connected to said exciter and to the field of said D. C. generator, said booster generator having a field electrically connected in parallel with the field of said D. C. generator.

2. In an electrical system, the combination of a synchronous motor, a D. C. generator driven thereby, a D. C. motor electrically connected to said generator, an exciter driven by said synchronous motor, a field winding on said D. C. generator connected to said exciter, means for varying the resistance in the circuit of said field winding to control the operation of said D. C. motor, a second exciter driven by said synchronous motor having a field winding in parallel with the field winding of said D. C. generator and means connecting said second exciter to the field of said synchronous motor.

3. In an electrical system, the combination of a synchronous motor, a D. C. generator driven thereby, a D. C. motor electrically connected to said generator, an exciter driven by said synchronous motor, a field winding on said D. C. generator connected to said exciter, means for varying the resistance in the circuit of said field winding to control the operation of said D. C. motor, means for connecting said exciter to the field of said synchronous motor, a second exciter driven by said synchronous motor having a field winding in parallel with the field winding of said D. C. generator and means connecting said second exciter to the field of said synchronous motor.

4. In an electrical system, the combination of a synchronous motor, a D. C. generator driven thereby, a D. C. motor electrically connected to said generator, an exciter driven by said synchronous motor, a field winding on said D. C. generator connected to said exciter, means for varying the resistance in the circuit of said field winding to control the operation of said D. C. motor, a booster generator driven by said synchronous motor and connected in series with said exciter and the field windings of said synchronous motor, a field for said booster generator, connected in parallel with the field winding of said D. C. generator.

In testimony whereof I affix my signature.

CHARLES R. FISHER.